(12) United States Patent
Kwon et al.

(10) Patent No.: US 7,308,923 B2
(45) Date of Patent: Dec. 18, 2007

(54) DIPPED CORD USING HYBRID CORD AND A RADIAL TIRE USING THE SAME

(75) Inventors: Ik-Hyun Kwon, Kyonggi-do (KR);
Soo-Myung Choi, Kyonggi-do (KR);
Yun-Hyuk Bang, Kyonggi-do (KR);
Si-Hwan Joo, Anyang-si (KR)

(73) Assignee: Hyosung Corporation, Kyonggi-do (KR)

( * ) Notice: Subject to any disclaimer, the term of this patent is extended or adjusted under 35 U.S.C. 154(b) by 134 days.

(21) Appl. No.: 11/196,759

(22) Filed: Aug. 4, 2005

(65) Prior Publication Data
US 2006/0207706 A1 Sep. 21, 2006

(30) Foreign Application Priority Data
Mar. 18, 2005 (KR) .............. 10-2005-0022668
Apr. 28, 2005 (KR) .............. 10-2005-0035374

(51) Int. Cl.
*D02G 3/48* (2006.01)
*B60C 9/00* (2006.01)
*B32B 19/00* (2006.01)

(52) U.S. Cl. ............ 152/451; 152/527; 152/556; 428/357; 428/364; 428/393; 57/902

(58) Field of Classification Search .............. None
See application file for complete search history.

(56) References Cited
U.S. PATENT DOCUMENTS
3,429,354 A  2/1969  Brooks 6,601,378 B1  8/2003  Fritsch et al.
2002/0195185 A1  12/2002  Choi et al.
2003/0159768 A1  8/2003  Fritsch (Continued)

FOREIGN PATENT DOCUMENTS
EP  1433881  *  6/2004

(Continued)

OTHER PUBLICATIONS

Extended EP Search Report dated Jul. 4, 2006 in EP 05107579.4.

*Primary Examiner*—Justin R. Fischer
(74) *Attorney, Agent, or Firm*—Nixon & Vanderhye P.C.

(57) ABSTRACT

It is an object of the present invention to provide a hybrid dip cord consisting of rayon yarn and lyocell yarn to apply to the carcass ply or cap ply (belt reinforced layer) of pneumatic radial tire used in a car and a radial tire using the same. And also, according to the present invent the hybrid dip cord and the radial tire for application to the carcass ply or cap ply (belt reinforced layer) of pneumatic radial tire used in cars are produced by means of the following steps; imparting S direction twist of 20 to 200 TPM yarn number to one rayon yarn to produce a pre-yarn, imparting twist to said one rayon pre-yarn and one non-twisted lyocell respectively to produce a ply twist yarn, and imparting cable twist to two ply of ply twist yarn made from combination of said ply twist yarn or impart cable twist to a ply twist yarn to be produced by regulating low the twist number of one lyocell yarn and the rayon yarn to one lyocell as 20 to 200 TPM when the ply twist processes.

12 Claims, 2 Drawing Sheets

U.S. PATENT DOCUMENTS

2005/0066646 A1    3/2005    Kwon et al.

FOREIGN PATENT DOCUMENTS

| | | |
|---|---|---|
| EP | 1 493 850 A | 1/2005 |
| GB | 1 273 403 A | 5/1972 |
| GB | 1 481 684 A | 8/1977 |
| JP | 2004-306637 * | 11/2004 |
| KR | 2005/0001113 A | 6/2003 |
| WO | WO 03/012183 A | 2/2003 |

* cited by examiner

DIPPED CORD USING HYBRID CORD AND A RADIAL TIRE USING THE SAME

BACKGROUND OF THE INVENTION

1. Field of the Invention

The present invention relates to a dipped cord and a radial tire, in particular a dipped cord using a hybrid cord and a radial tire using the same.

2. Background of the Invention

The conventional radial tire has been constructed with a carcass ply around that a rubber is reinforced with a fabric cord such as polyester or rayon and a belt structure that a rubber is reinforced with steel cord. And, also, for preventing the tire from deviating from the rim and for keeping stability a bead-wire is reinforced at the place where the tire contacts the rim, and the bead-wire also plays a role to fix the carcass ply.

In case of original pneumatic radial tire, a canvas sheet made from cotton has been used as carcass material, and as synthetic fabric develops some fabric such as rayon, nylon and polyester is utilized for carcass ply material, and lately a steel cord is partly utilized Generally, for the carcass-ply material of pneumatic radial tire, in particular carcass ply material of pneumatic radial tire having aspect ratio of 0.65 to 0.82, polyester is generally used, and for the reinforced-material of the carcass ply of the pneumatic radial tire having relatively low aspect ratio, in particular lower than 0.6 for use at high speed, rayon is commonly utilized. Lately in case of this radial tire with low aspect ratio for use at high speed polyester is partly used, but the application of polyester is limited because of worse physical quality and shape stability at high temperature.

Lately in order to solve this problem, polyethylenenaphthalate which has better physical property and shape stability than polyethyleneterephthalate is partly utilized, but the application of polyethylenenaphthalate is constrained owing to the fact that in spite of better strength the adhesion to rubber is worse compared with rayon.

In case of lyocell, the adhesion of lyocell to rubber is better than that of fabrics from polyesters and the elasticity of lyocell is superior to that of rayon, but disadvantageously the fatigue resistance of lyocell is worse than that of rayon. Even though rayon fabric which is superior to lyocell in elongation is used, rayon fabric has disadvantage that the humidity elasticity of rayon fabric is relatively low.

SUMMARY OF THE INVENTION

The present invention has been contrived for solving the above-mentioned problem, and it is an object of the present invention to provide a hybrid dipped cord made from rayon yarn and lyocell yarn and a radial tire using the same for applying to the carcass ply or cap ply (a belt reinforced layer) of pneumatic radial tire used in a car.

And also, for applying to the carcass ply of pneumatic radial tire or the cap ply (belt reinforced layer) used in a car, there is provided with a hybrid dipped cord and the radial tire comprising the same produced by the following steps of; producing a pre-twisted yarn by making one rayon yarn twisted toward S direction in twisting number between 20 to 200 TPM, producing ply by twisting pre-twisted rayon yarn and not-pre-twisted lyocell yarn toward Z direction between 300 to 500 TPM, respectively, producing a raw cord by cable-twisting the combined two yarns of the ply yarns toward S direction between 300 to 500 TMP, and immersing the raw cord into dipping solution.

Alternatively in step of producing a twist yarn the twist yarn may be produced by regulating the twist number of the rayon yarn to be less than that of the lyocell yarn by 20 to 200 TPM for ply-twisting.

THE DETAILED DESCRIPTION OF THE INVENTION

Figure 1:
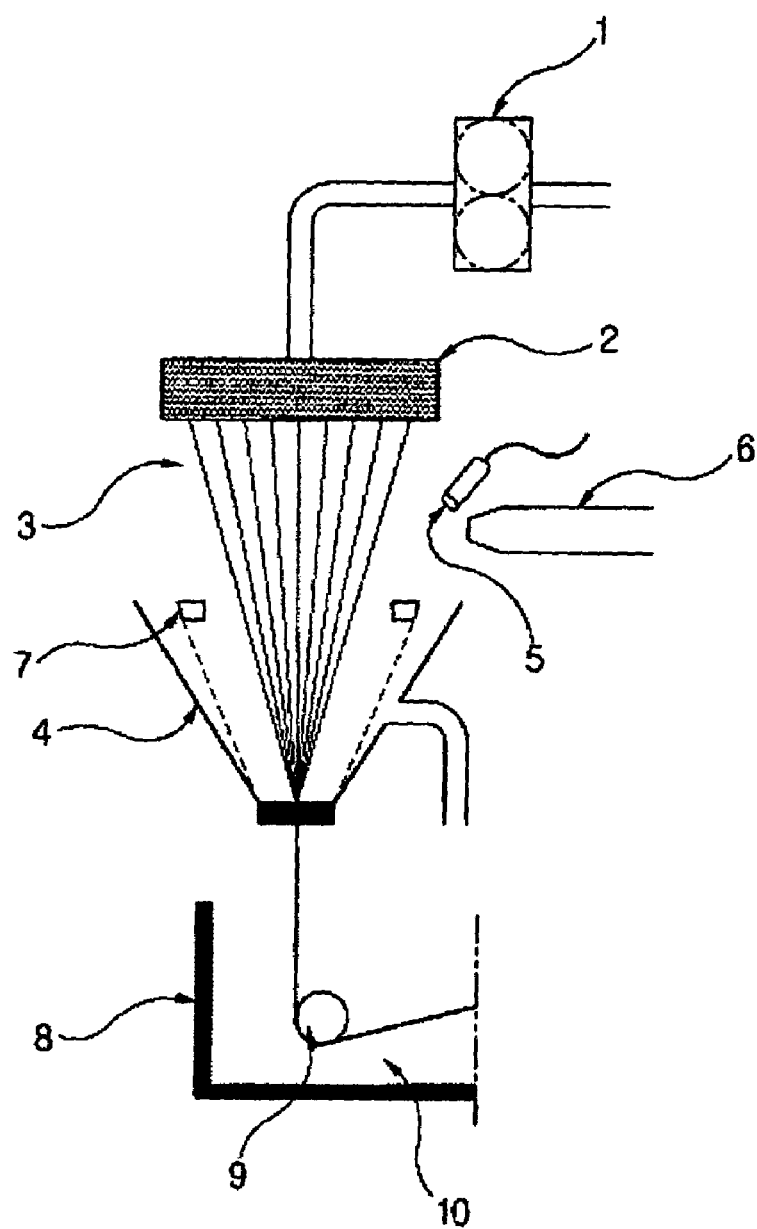
FIG. 1 shows a schematic view of spinning and drawing process for manufacturing a lyocell yarn according to the present invention.

The present invention provides hybrid dipped cord comprising rayon yarn between 500 to 3000 deniers and lyocell yarn between 500 to 3000 deniers. And also, the present invention provides a hybrid dipped cord produced by the followings steps of; producing a pre-twisted yarn by making rayon twisted toward S direction between 20 to 200 TPM, producing ply by twisting pre-twisted rayon yarn and not-pre-twisted lyocell yarn toward Z direction between 300 to 500 TPM, respectively, producing a raw cord by cable-twisting the combined two yarns of the ply yarns toward S direction between 300 to 500 TMP, and immersing the raw cord into dipping solution.

And also, the present invention provides a hybrid dipped cord produced by the following steps of; producing a ply yarn by twisting one rayon yarn and one lyocell yarn toward Z direction in a manner that the twist number of the rayon yarn is less than that of the lyocell yarn by 20 to 200 TPM, producing a raw cord by cable-twisting the combined two yarns of the rayon yarn and the lyocell yarn toward S direction in the twist number of between 300 to 500 PTM; and dipping the raw cord into dipping solution.

And also, the fineness of the rayon yarn and the lyocell yarn according to the present invention may be 500 to 3000 deniers, respectively.

And also, the present invention comprises a pair of parallel bead cord, at least one radial carcass ply surrounded about the bead cord, a belt layer laminated on the outer surrounding surface of the carcass ply and a belt reinforced layer formed in the circumference direction on the outer surrounding surface of the belt layer, and the radial pneumatic tire of the present invention is characterized in that the carcass ply and the belt reinforced layer comprise the hybrid dipped cord.

The method for producing the lyocell of this present invention will be described in detail in the following.

In this specification, the term "ply twist" or "ply-twisted" means that one yarn is twisted in one direction, for example in S or Z direction. And the term "pre-twisted" means that one yarn is twisted in counter-direction to the ply-twisted direction. On the other hand, the term "cable twist" or "cable-twisted" means that two yarns are twisted in one direction, for example in S direction. That is two ply-twisted yarns may be cable-twisted in S direction. And also, it should be noted that S or Z direction indicates not a fixed direction, but a random direction. Therefore, if a random direction is represented as S direction, then any other direction than S direction may be indicated as Z direction. That is, S and Z direction represents different directions each other.

As pre-process for producing the hybrid cord according to the present invention a lyocell multi-filament may be produced by the following steps. Generally the lyocell multi-filament may be produced by means of the following steps. (i) producing a spinning solution (Dope) by resolving a cellulose into a mixture of N-methyl morphorin N-oxide (abbreviated as NMMO); (ii) extruded-spinning the spinning solution with a spinning-nozzle containing orifices which have a diameter of 100 to 300 μm, a length of 200 to 2,400, the length/diameter ratio of 2 to 8 and a distance of 1.0 to 5.0 μm between the orifices, and then coagulating the spinning solution to obtain multi-filaments, (iii) introducing the obtained multi-filaments into a coagulating bath to water-wash and (iv) winding the obtained multi-filament after drying and oil-treating.

Each step for producing lyocell multi-filaments of the present invention will be described in detail in the following In the step of producing a spinning solution (i), cellulose is dissolved into a mixing solution of NMMO and water to prepare a spinning solution (Dope).

To produce the lyocell multi-filaments for tire cord according to the present invention, cellulose with high purity should be used. It has been known that lignin has an amorphous structure and hemi-cellulose has a low crystallization structure, and therefore for producing cellulose fabrics with high quality cellulose that has minimum content of the lignin and hemi-cellulose and maximum content of α—cellulose is preferably used, and the high physical property may be obtained by high oriented and crystallized structure using cellulose components with high polymerization degree. Preferably soft wood pulp with DP 800 to 1,200 or α—cellulose content above 93% may be used.

According to the present invention, the mixture of NMMO/water may be used as a solvent when preparing a spinning solution, and in case of NMMO a NMMO hydrates with water content of 10 to 20 wt %, preferably 13 wt % may be used.

According to the present invention, it is important to prepare a much homogenized and concentrated spinning solution by enhancing the penetration of the solvent for producing fabrics with better physical property, and hence an apparatus to grant high shear stress is required, and also a suitable resolving temperature of 80 to 130° C. should be kept. If the resolving temperature is above 130° C., then the molecular weight of cellulose is reduced owing to the pyrolysis of cellulose to increase terminal groups of molecular chain resulting to the poor mechanical properties and to cause the resolution of NMMO, while if the resolving temperature is below 80° C., then the time and energy to resolve sufficiently increase resulting to the production of cellulose with low concentration.

And also, for preparing a homogenized spinning solution without non-resolved cellulose particles a kneader may be used, and for example cellulose powder is input into the kneader together with a concentrated liquid NMMO, and then the mixture is mixed within the kneader and dispersion, shearing, compression and overlapping may be repeatedly performed, and subsequently the pasted cellulose powder is continuously injected into a extruder connected to the kneader for resolving.

According to other method for producing a cellulose solution of the present invention, dispersion, mixing, shearing, kneading, resolving and swelling to give a weighting function with twin-axes extruder are performed on a supplied solid NMMO and powder cellulose to produce homogenized cellulose.

In the step of extruded-spinning (ii), the spinning solution is extruded-spun with a spinning-nozzle having a plurality of orifices which have a diameter of 100 or 300 μm, a length of 200 to 2,400 μm, the length ratio to the diameter (L/D) of 2 to 8 and the distance between orifices of 2.0 to 5.0 mm to be introduced into the upper part of a coagulating bath in shape of cone through an air layer, and then multi-filaments may be obtained after consolidating.

FIG. 1 shows the spinning process of the present invention.

Referring to FIG. 1, if a cellulose solution is supplied in constant rate from a gear pump 1, a spinning solution may be introduced into the surface of a coagulating solution from a spinning nozzle 2 vertically passing an air layer 3. The nozzle 2 is in the shape of a cylinder and the diameter of the nozzle 2 is 50 to 160 mm, and preferably 80 to 130 mm. If the diameter of the nozzle 2 is below 50 mm, then the distance between orifices are so small that the cooling efficiency is bad and adhesion occurs before coagulation of the discharged solution, while if the diameter of the nozzle 2 is too big, then the pack for spinning and the peripheral apparatus such as nozzle are so large to cause disadvantage in view of plant. And also, if the diameter of orifice in the nozzle is less than 100 μm, then the spinning property may be bad such as yarns are often cut on spinning, while if the diameter of orifice is more than 300 μm, then the coagulating rate is slow in the coagulating bath and it is difficult to water-wash NMMO.

If the length of the orifice in the nozzle is less than 200 μm, the physical property is bad because of the low orientation of the solution, while if more than 2,400 μm, the cost for manufacturing the orifice of the nozzle may be high and the endeavor for constructing the equipment may be excessive.

Considering the use of the dipped cord, namely the use in tire cord and industrial material and the required space between orifices for uniform cooling of the solution, the number of the orifices may be 500 to 1,500, and preferably 800 to 1,200.

For now lyocell fabric for industrial use has been developed, but the development of high strength filament for use of tire cord and the like has never reported, for the more are the number of filaments to be spun, the much effected on is the spinning property and the higher spinning technical level is required. For solving the above problem, the present invention utilizes a spinning nozzle 2 comprising the orifices to meet the foregoing conditions in above-mentioned numbers. If the number of orifices is less than 500, then the coagulation and water-washing cannot be performed completely because the fineness of each filament is too thick for NMMO to be extracted in short time. On the other hand if the number of orifices is more than 1500, then the contacted yarns between adjacent filaments may be easily produced, and the stability of each filament may be weak after spinning resulting to the degradation of physical property and subsequently some problems may be caused in the process of elongation and heat-treatment for application of tire cord.

When the spinning solution is coagulated into the upper part of the coagulating solution after passing the spinning nozzle 2, if the diameter of the fluid is large, then it is difficult to obtain fiber with the fine and uniform structure because the coagulating rates between the outer surface and the inner part is so different from each other.

Therefore, even though the same amount of cellulose spinning solution is discharged, it should be fed into the coagulating solution keeping the spun fiber to have thinner diameter by regulating suitably the air layer. If the distance of the air layer is too short, it is difficult to increase the spinning rate because the fine-pore developing fraction which may be caused from rapid surface-layer solidification and desolventation increases preventing the increase of the draw rate, on the other hand if the distance of the air layer is too long, then it is difficult to maintain the process stability because of the effect of the filament adhesion, ambient temperature and humidity. The distance of the air layer may be 20 to 300 mm, preferably 30 to 200 mm.

When the filament passes the air layer 3, the cooling air may be supplied with the filament in order to avoid melt-adhesion by cooling and solidifying the filaments and to improve the penetration-resistance against the coagulating solution, and a sensor 5 for detecting the ambient of the air layer 3 may be installed between an opening of a cooling air supplying device 6 and the filaments to monitor and to regulate the temperature and humidity. Generally the temperature of the supplied air may be kept in the range of 5 to 20° C. If the temperature of the air is less than 5° C., the filament solidification can be accelerated to obstruct the high-speed spinning, while if the temperature of the air is higher than 20° C., a cut yarn may result from reduced penetration resistance to the interface of the coagulating solution.

And also, the moisture content in the air may be important factor to affect coagulating process of the filament, and hence the relative humidity within the air layer 3 has to be regulated between RH 10% and 50%. More specifically, the condition of dried air of RH 10% to 30% adjacent to the nozzle and wet air of RH 30% to 50% adjacent to the coagulating solution improve the stability in view of the coagulating rate and melt-adhesion of the surface of the spinning nozzle. The cooling air is blown horizontally in the side of the filaments discharged vertically, and the wind speed may be 1 to 10 m/s, and preferably 2 to 7 m/s. If the wind speed is too slow, then the cooling air cannot be superior to other atmosphere condition of the filaments discharged to the cooling air and hence it is difficult to produce uniform filaments because the solidifying rate difference may be caused between a part of filaments that the cooling air reaches later from the spinning nozzle and other part resulting to cut yarns. On the other hand, if the wind speed is too high, the route of the filament may swing to cause a risk of adhesion and hinder flow of uniform solidifying solution resulting to degradation of the spinning stability.

According to the present invention, the solution of an upper coagulating bath comprises NMMO aqueous solution of 5 to 20%.

If the spinning speed is more than 50 m/min when the filaments pass the upper coagulating bath 4, the agitation of the coagulating solution may be intense because of the friction between the filaments and the coagulating solution. For obtaining excellent physical properties in drawing and orientation and improving productivity by the increase of the spinning speed, this phenomenon should be minimized because the process stability may be impaired. Therefore, a mesh network 7 of a doughnut shape may be installed in the surface of the upper coagulating bath 4 to make the coagulating solution flow in the same downward direction as the advancing direction of the filaments for smooth development of the drawing—orientation.

In step (iii) of the present invention, the obtained multi-filaments may be again introduced to a lower coagulating bath 8 to change the advancing direction toward a water-washing bath, the flowing coagulating solution accompanied by the filaments within the upper coagulating bath may be collected into the lower coagulating bath 8, and a roller 9 may be installed within the lower coagulating bath 8 to change the flowing direction of the coagulating solution in the horizontal direction. The roller 9 may be rotated to reduce frictional resistance. In order that the concentration of the solution in the upper coagulating bath 4 may be similar to that of the coagulating solution or deviated within −0.5 to +0.5% a control bath can be installed separately and hence the coagulating solution may be circulate to make the concentration of the upper coagulating bath 4 be similar to that of the lower coagulating bath 8 or differ from that of the lower coagulating bath 8 within 0.5% tolerance. When the filaments pass the upper coagulating bath 4 and the lower coagulating bath 8, the desolvation of the coagulating solution and the drawing to affect greatly the properties of the filaments may be simultaneously performed, and so it is necessary to keep the temperature and concentration of the coagulating solution constant. The filaments passing the lower coagulating bath 8 may be water-washed in a water-washing bath. The method for water-washing the filament has been well known to the skilled in this art.

In step (iv) of the present invention, the water-washed multi-filaments may be dried, oil-treated and wound. The process for drying, oil-treating and winding may be implemented in a known manner. There may be provided with a tire-cord and filament-raw yarns for industrial use after the process for drying, oil-treating and winding.

The total denier range of the lyocell multi filaments according to the present invention may be 500 to 3,000, and the breaking load may be 5.0 to 30.0 kg. The multi filaments comprise 250 to 2000 filaments, and each of the filaments has the fineness of 0.5 to 4.0 deniers.

According to the present invention, there may be provided with a hybrid dipped cord comprising the lyocell multi-filaments and rayon yarns of 500 to 3,000 deniers. In this case, the rayon yarns may be any rayon yarns produced by a known method in this art. For example, the rayon yarns used for producing the hybrid dipped cord may be the ware made in Cordenka 700 (Registered Trademark).

For producing the hybrid dipped cord using the lyocell yarns and rayon yarns according to the present invention, as pre-process for producing the dipped cord a process for producing a raw cord to give twists may be implemented (yarn-twist process).

According to the present invention, there may be provided with a raw cord produced through the following steps; producing a pre-twisted yarn by making rayon twisted toward S direction between 20 to 200 TPM, producing ply by twisting pre-twisted rayon yarn and not-pre-twisted lyocell yarn toward Z direction between 300 to 500 TPM, respectively, producing a raw cord by cable-twisting the combined two yarns of the ply yarns toward S direction between 300 to 500 TMP, or producing a ply yarn by twisting one rayon yarn and one lyocell yarn toward Z direction in a manner that the twist number of the rayon yarn is less than that of the lyocell yarn by 20 to 200 TPM, producing a raw cord by cable-twisting the combined two yarns of the rayon yarn and the lyocell yarn toward S direction in the twist number of between 300 to 500 PTM.

The method for producing the hybrid dipped cord according to the present invention comprises a process for dipping the raw cord into a dipping solution.

The present invention is characterized in that the method for producing the hybrid dipped cord comprises a step for producing a ply twisted yarn in which the pre-twisted yarn is produced by making one rayon yarn twisted toward S direction in 20 to 200 PTM twist numbers or by making the twist number of one rayon yarn be 20 to 200 TPM less than that of the lyocell, and then the cable yarn process is implemented.

The advantage of the process according to the present invention is that the fatigue resistance can improve because the tensile stress to the rayon works first of all in the initial elongation of the raw cord. In this case, if the twist number of rayon yarn is less than that of lyocell by 20 TPM, then the twist effect may be slight, while if the twist number of rayon yarn is more than 200 TPM, than the elasticity of the raw cord may be reduced in the elongation of the raw cord because the tensile stress may be intensified in excess.

And also, the physical properties such as the strength and elongation, elongation or fatigue resistance may be changed depending on the twist number of the lyocell and rayon yarns in the ply yarn process or cable yarn process. Generally as the twist number increases, the strength tends to decrease and the elongation and breaking elongation tends to increase. And also, the fatigue resistance tends to increase as the increase of the twist number. In the hybrid cord according to the present invention, the twist number of the ply yarn or the cable yarn is 300/300 TMP to 500/500 TPM, and the reason why the twist number of the ply yarn is identical to that of the cable yarn is that the expression of the physical property can be maximized by keeping the produced tire cord in straight with ease without rotating or twisting. In this case, if the twist number is less than 300/300 TPM, then the fatigue resistance tends to be degraded owing to the breaking elongation decrease of the raw cord, while if more than 500/500 TPM, then the raw cord is not suitable for use of tire cord owing to the strength decrease.

The produced raw cord may be fabricated with a weaving machine, and then the obtained fiber is dipped into a dipping solution to produce a dip cord for use of tire cord after hardening wherein a resin layer may be attached on the surface of the raw cord.

Describing in detail about the dipping process of the present invention, in the dipping process a resin layer of RFL (Resorcinol—Formalin—Latex) is concave immersed on the surface of the fiber for improving the weakness of the adhesion to rubber occurring generally to the tire cord.

According to the present invention, the hybrid cord and a paste can be produced by the exemplary method comprising the following steps, but it should be understood that the present invention is not limited by the method.

A solution comprising as the following is produced.

| | |
|---|---|
| 29.4 wt % resorcinol | 45.6 parts |
| Purified water: | 255.5 parts |
| 37 wt % Formalin | 20 parts |
| 10 wt % Sodium Hydroxide | 3.8 parts |

The above components are mixed stirring for 5 hours at 25° C. for reacting, and then the following components are added to.

| | |
|---|---|
| 40 wt % VP-Latex: | 300 parts |
| Purified water: | 129 parts |
| 28% Ammonia Hydroxide: | 23.8 parts |

After the above components are added to, the solution is matured for 20 hours at 25° C. to maintain the solid components in 19.05% concentration.

After the fiber is dried, the adhering solution is spread on the fiber, and for regulating the amount of the adhesion the fiber is advantageously stretched in the amount of 0 to 3%, preferably 1 to 2%. In this case, if the amount of stretch is too much, the gluing amount of the adhering solution can be regulated, but the property of breaking elongation may be degraded resulting to the decrease of fatigue resistance, while if the amount of the stretch is too small, for example if the amount of stretch is 0%, then it is impossible to regulate DPU because the dipping solution may penetrate within the rayon cord.

The glued amount of the adhesion may be advantageously 4 to 6% compared to the fiber weight. The cord on which the adhering solution is attached is dried at the temperature of 120 to 150° C. The dry process may be implemented for 180 to 220 seconds, and it is important for the cord to be stretched in the range of 1 to 2% during the drying process. If the stretching degree is too small, the core has poor physical property for application to the tire cord owing to the increase of the elongation and the breaking elongation, while if the stretching degree is more than 3%, then the level of the elongation is suitable but the breaking elongation is too low resulting to disadvantage in the fatigue resistance.

After drying, the cord may be heat-treated at the temperature of 130 to 240° C. In heat-treating the stretching range may remain in −2 to 0%, and the suitable time for the heat-treatment may be 50 to 90 seconds. If the time is less than 50 seconds, then the adhesion degree may be bad owing to the lack of the reaction time for the adhering solution, while if more than 90 seconds, then the hardness of the adhering solution is so high that the fatigue resistance decreases.

A carcass ply and cap ply of a car tire can be manufactured using the dipped cord according to the present invention.

Figure 2:
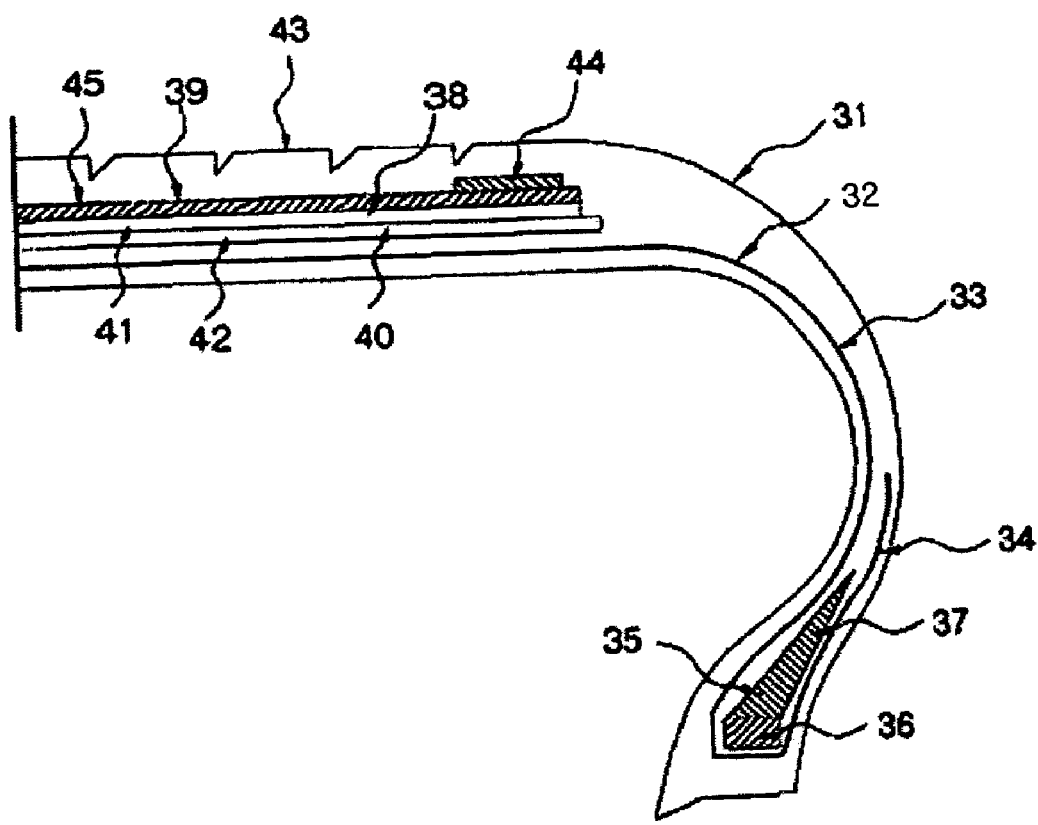
FIG. 2 shows the structure of a tire in a car having the carcass layer or belt reinforced layer with the lyocell and rayon hybrid cord according to the present invention.

FIG. 2 shows a diagrammatic view of the structure of a carcass or cap ply used in a car tire with the hybrid dipped cord according to the present invention.

The structure will be described in detail referring to FIG. 2 in the following.

A bead area 35 of a tire 31 has a circular shape of a bead core 36 having non-elongation property. The bead core 36 may be preferably made as a single filament strength line wound continuously. In a preferred embodiment of the present invention, a strength line of 0.95 mm to 1.00 mm with a high strength may be 4×4 structure or 4×5 structure.

In a substantial embodiment of the present invention, the bead area has also a bead filler 37, and in case of the bead filler constant strength above a predetermined level may be required, for example preferably above Shore A hardness 40.

According to the present invention, the crown part of a tire can be reinforced by a belt 38 and a cap ply 39 structure. The belt structure comprises a pair of breaking belt ply 40 and a core 41 of the belt ply may be oriented forming about 20° angle from the central surface in the circumference direction of the tire. The core 41 of the belt ply will be coordinated against the central surface of the circumference direction and at the same time opposite a cord 42 of other belt ply. But the belt 38 may comprise a plurality of plies and may be arranged in the range of 16 to 24°. The belt 38 may have a function to supply strength in the side direction for minimizing the lift of a tread 43 from the surface of a road in rotation of the tire. The cord 41, 42 of the tire may be made from steel and may have 2+2 structure, but have any shape. The upper part of the belt 38 may be reinforced with the cap ply 41 and an edge ply 44, and a cap ply cord 45 within the cap ply 39 may be reinforced in parallel direction with the circumference direction of the tire to suppress the size variation in the circumference caused from the high speed rotation of the tire, and therefore the cap ply cord 45 advantageously has high heat-contraction stress force at high temperature. The cap ply cord may be made from the hybrid dipped cord comprising the lyocell and rayon yarns according to the present invention. The cap ply cord may comprise a cap ply 39 with one or two layers and an edge ply 41 with the same layers, and preferably a cap ply with one layer and an edge ply with the same layer.

In the following the structure and the effect of the present invention will be described in detail using examples and comparisons not limiting the scope of the present invention. In the examples and comparisons the physical properties were estimated as the following methods.

(a) Strength (kgf) and elongation (%) at specific load of the hybrid tire cord

The tenacity of the hybrid dipped cord was tested with a low speed elongation testing device (Instron Co., Ltd, USA), and the test was performed after the cord was dried at 107° C. for 2 hours. The length of the sample was 250 mm and the elongation speed was 300 m/min. In this test, the elongation at specific load was estimated under 4.5 kg load.

(b) Shrinkage (%)

The shrinkage was estimated as the following; after the sample was deposited at 25° C. and 65% RH for 24 hours under a 0.05 g/d static load the length (L0) was measured. After this the sample was at 150° C. temperature and a 0.05 g/d static load for 30 minutes and the length (L1) was measured. The shrinkage was calculated as the following equation:

$$S(\%) = (L0 - L1)/L0 * 100.$$

(c) E–S value of the hybrid dipped cord

For explaining the present invention, the elongation at specific load may be indicated as 'E' while the shrinkage of the above (b) may be indicated as 'S', and the sum of the elongation (E) and the shrinkage (S) refers to 'E–S value', as shown in the following equation:

$$E{-}S = \text{the value of elongation at specific load (\%)} + \text{the value of shrinkage (\%)}.$$

(d) Fatigue resistance

The Fatigue resistance was compared with the measurement of the residual strength after fatigue-test using Belt Fatigue Tester that is commonly utilized for testing the fatigue resistance of a tire cord. The condition for testing the fatigue resistance was under 40° C., load 70 kg, and 34.58% compression, and the rubber was immersed into tetrachloroethylene solution for 24 hours after the test of the fatigue resistance, and then the rubber was swollen to measure the residual strength with the rubber and the cord separated. The residual strength was estimated using a common tensile strength tester after drying at 107° C. for 2 hours according to the foregoing method described in (a).

EXAMPLE 1

For producing a reinforced fiber for reinforcing a tire, a lyocell fiber and rayon fiber were obtained respectively according to the method described in the above. One yarn was produced in a manner that after 40 TPM pre-twist was given to one rayon yarn (1500D, Cordenka 700) the pre-twisted rayon yarn (100D, Cordenka 700) and one not-twisted lyocell yarn (1500D) are twisted in 420 TPM, respectively, and then the ply yarns were made in two combined ply yarns to produce a raw cord by giving cable twist in 420 TPM.

The obtained hybrid raw cord was dried at 100° C. for 130 seconds to subsequently to pass an adhesion solution with the following components. In the drying process the cord was stretched in amount of 2% for avoiding non-homogeneity of the raw cord from a heat contraction.

| 29.4 wt % resorcinol: | 45.6 parts |
| Pure water: | 255.5 parts |
| 37% formalin: | 20 parts |
| 10 wt % sodium hydroxide | 3.8 parts |

After the solution with the above components was prepared the solution was stirred for reacting at 25° C. for 5 hours, and then the following components was added.

| 40 wt % VP-Latex: | 300 parts |
| Pure water: | 129 parts |
| 28 ammonia hydroxide: | 23.8 parts |

After the above components were added, the solution was matured at 25° C. for 20 hours keeping solid components to be 19.05 concentrations.

After the adhesion solution was given and dried at 150° C. for 2 minutes, the process for treating the adhesion was completed with heat-treatment at 170° C. for 1 minute.

The physical properties of the dipped cord produced in the above manner was estimated and shown in table 1.

EXAMPLE 2

Except for pre-twisting the rayon yarn (1500 D, Cordenak 700) in 80 TPM, the raw cord and the treated cord were produced in a manner similar to example 1. The physical properties of the produced dipped cord were estimated and shown in table 1.

EXAMPLE 3

Ply yarns were prepared by twisting one rayon yarn (1500D, Cordenka 700) and one lyocell yarn (1500) in 360 TPM and 420 TPM, respectively, and then the ply yarns were combined in two ply yarns to be twisted in cable yarn of 420 TPM for producing the raw cord, and the other processes of example 3 were implemented in similar manner to those of example 1. The physical properties of the produced dipped cord were estimated and shown in table 1.

EXAMPLE 4

Ply yarns were prepared by twisting one rayon yarn (1500D, Cordenka 700) and one lyocell yarn (1500) in 300 TPM and 420 TPM, respectively, and then the ply yarns were combined in two ply yarns to be twisted in cable yarn of 420 TPM for producing the raw cord, and the other processes of example 3 were implemented in similar manner to those of example 1. The physical properties of the produced dipped cord were estimated and shown in table 1.

Comparison 1

Except for non-pre-twisting rayon yarn (1500 D, Cordenak 700), the raw cord and the treated cord were produced in a manner similar to example 1. The physical properties of the produced dipped cord was estimated and shown in table 1.

Comparison 2

Except for pre-twisting rayon yarn (1500 D, Cordenak 700) in 10 TPM, the raw cord and the treated cord were produced in a manner similar to example 1. The physical properties of the produced dipped cord was estimated and shown in table 1.

Comparison 3

Except for pre-twisting rayon yarn (1500 D, Cordenak 700) in 210 TPM, the raw cord and the treated cord were produced in a manner similar to example 1. The physical properties of the produced dipped cord were estimated and shown in table 1.

Comparison 4

Except for twisting one rayon yarn (1500 D, Cordenak 700) and one lyocell yarn (1500D) in ply yarn of 410 TPM and 420 TPM, respectively, the raw cord and the treated cord were produced in a manner similar to example 1. The physical properties of the produced dipped cord were estimated and shown in table 1.

Comparison 5

Except for twisting one rayon yarn (1500D, Cordenak 700) and one lyocell yarn (1500D) in ply yarn of 210 TPM and 420 TPM, respectively, the raw cord and the treated cord were produced in a manner similar to example 1. The physical properties of the produced dipped cord were estimated and shown in table 1.

Comparison 6

Except for twisting lyocell yarn in ply yarn of 420 TPM and cable yarn of 420 TPM without pre-twisting, the raw cord and the treated cord were produced in a manner similar to example 1. The physical properties of the produced dipped cord was estimated and shown in table 1.

Comparison 7

Except for twisting rayon yarn in ply yarn of 420 TPM and cable yarn of 420 TPM without pre-twisting, the raw cord and the treated cord were produced in a manner similar to example 1. The physical properties of the produced dipped cord was estimated and shown in table 1.

TABLE 1

Physical properties of the produced cords

Properties of Treatment Cord

|  | ST(kg) | E | S | ES.v | FR | Compensation |
|---|---|---|---|---|---|---|
| Example 1 | 18.1 | 1.3 | 0.3 | 1.6 | 76 |  |
| Example 2 | 19.2 | 1.4 | 0.3 | 1.7 | 78 |  |
| Example 3 | 18.5 | 1.3 | 0.3 | 1.6 | 77 |  |
| Example 4 | 19.4 | 1.4 | 0.3 | 1.7 | 80 |  |
| Comp. 1 | 18.0 | 1.3 | 0.2 | 1.5 | 40 | L-FR |
| Comp. 2 | 18.4 | 1.3 | 0.3 | 1.6 | 50 | Relatively L-FR |
| Comp. 3 | 19.1 | 1.9 | 1.0 | 2.9 | 65 | H-ES.v & L-FR |
| Comp. 4 | 18.5 | 1.3 | 0.3 | 1.6 | 49 | L-FR |
| Comp. 5 | 19.2 | 2.0 | 1.0 | 3.0 | 67 | H-ES.v & L-FR |
| Comp. 6 | 18.5 | 1.2 | 0.1 | 1.3 | 31 | L-FR |
| Comp. 7 | 18.0 | 2.1 | 1.3 | 3.4 | 95 |  |

* In Table 1, ST, E, S, ES.v and FR represent strength, elongation, shrinkage, E-S value and Fatigue Resistance, respectively. And also, L and H represent Low and High, respectively. For Example, L-FR represents Low Fatigue Resistance.

Referring to Table 1, the hybrid dipped cord according to the present invention (shown in Table 1 as example 1, 2, 3 and 4) has much improved properties in strength, E-S value and fatigue resistance compared with the hybrid dipped cord having a non-pre-twisted rayon yarn and ply-twisted in the same twist number (as shown in comparison 1 of Table 1).

And also, the hybrid dipped cord having the pre-twisted rayon yarns of 10 and 210 TPM (comparison 2, and 3) and the hybrid dipped cord having the rayon twisted in ply yarn of 410 and 210 TPM (comparison 4, and 5) has shown low strength and fatigue resistance.

EXAMPLE 5

The radial tire with the cap ply produced by the use of the hybrid dipped cord according to the present invention comprises a carcass layer having an outer ply turn up in the radial direction, and the carcass layer includes one layer. In this case, the requirements of the carcass cord are shown in table 2, and the carcass cored may be made to be orientated at the angle of 90 degree against the middle surface of the circumference direction of the tire. The ply turn up 34 has a height of 40 to 80% to the maximum height of cross section of the tire. The bead part 35 has a bead core 36 formed into 4×4 high strength line in a diameter of 0.95 to 1.0 mm and a bead filler 37 having hardness more than shore A hardness 40. A belt 38 may be reinforced with a belt reinforcing layer including the cap ply 39 of one ply and the edge ply 44 of one ply and the cap ply cord in the cap ply 39 may be arranged in a manner to be parallel with the circumference direction of the tire.

EXAMPLE 6

Except for using the hybrid dipped cord produced by the method according to example 2 as the cord material for manufacturing the tire, a tire cord was produced by a method similar to example 5.

EXAMPLE 7

Except for using the hybrid dipped cord produced by the method according to example 3 as the cord material for manufacturing the tire, a tire cord was produced by a method similar to the method of example 5.

EXAMPLE 8

Except for using the hybrid dipped cord produced by the method according to example 4 as the cord material for manufacturing the tire, a tire cord was produced by a method similar to the method of example 5.

Comparison 8

Except for using the dipped cord produced by the method of comparison 1 as the cord material for manufacturing the tire, a tire was produced by the method similar to the method of example 5.

TABLE 2

The materials for the layers of the tire

|  |  | Ex. 5 | Ex. 6 | Ex. 7 | Ex. 8 | Com. 8 |
|---|---|---|---|---|---|---|
| Carcass | Material | PET | PET | PET | PET | PET |
|  | Standard (d/CTY) | 1500d/2 | 1500d/2 | 1500 d/2 | 1500 d/2 | 1500d/2 |
|  | Strength (Kg) | 24 | 24 | 24 | 24 | 24 |
|  | EC | 60 | 60 | 60 | 60 | 60 |

TABLE 2-continued

The materials for the layers of the tire

| | | Ex. 5 | Ex. 6 | Ex. 7 | Ex. 8 | Com. 8 |
|---|---|---|---|---|---|---|
| CP | Material | HC of Ex. 1 | HC of Ex. 2 | HC of Ex. 3 | HC of Ex. 4 | HC of Com. 1 |
| Tire | Flatness | 0.60 | 0.60 | 0.60 | 0.60 | 0.60 |
| | NCL | 1 | 1 | 1 | 1 | 1 |
| | NCP | 1 | 1 | 1 | 1 | 1 |

* In table 2, PET, HC and CP represent Poly-Ethylene Telephthalate, Hybrid dipped Cord and Cap Ply, respectively. And CTY, EC, NCL and NCP represent Combined Twisted Yarn, Elasticity Coefficient, the Number of Carcass Layer and the Number of Cap Ply, respectively.

EXAMPLE 9

The radial tire produced by using the hybrid dipped cord according to example 1 of the present invention has a carcass layer with an outer ply turn up in the radial direction, and the carcass ply comprises one layer. In this case, the requirements of the carcass cord are shown in Table 3 and the tire was produced by a method similar to example 5.

EXAMPLE 10

Except for using the hybrid dipped cord produced by example 2 as the cord material for manufacturing the tire, a tire was produced by a method similar to the method of example 5.

EXAMPLE 11

Except for using the hybrid dipped cord produced by example 3 as the cord material for manufacturing the tire, a tire was produced by a method similar to example 5.

EXAMPLE 12

Except for using the hybrid dipped cord produced by example 4 as the cord material for manufacturing the tire, a tire was produced by a method similar to example 5.

Comparison 9

Except for using the hybrid dipped cord produced by the method of comparison 1 as the cord material for manufacturing the tire, a tire was produced by a method similar to example 5.

TABLE 3

The materials for layers of a tire

| | | Ex. 9 | Ex. 10 | Ex. 11 | Ex. 12 | Com. 9 |
|---|---|---|---|---|---|---|
| Carcass | Material | HC of Ex. 1 | HC of Ex. 2 | HC of Ex. 2 | HC of Ex. 4 | DC of Com. 1 |
| Cap ply | Material | Nylon 66 | Nylon 66 | Nylon 66 | Nylon 66 | Nylon 66 |
| | Standard (d/CTY) | 1260D/ 2P | 1260D/ 2P | 1260D/ 2P | 1260D/ 2P | 1260D/ 2P |
| | Strength (Kg) | 22.4 | 22.4 | 22.4 | 22.4 | 22.4 |
| Tire | Flatness | 0.60 | 0.60 | 0.60 | 0.60 | 0.60 |
| | NCL | 2 | 2 | 2 | 2 | 2 |
| | NCP | 1 | 1 | 1 | 1 | 1 |

* In table 3, the abbreviation, for example HC, represents the same meaning as Table 2. In Particular DC represents Dipped Cord.

The noise occurring from the 205/65 R15 V tire of a 2000 cc grade car at the speed of 60 km/h produced by the methods according to example 5, 6, 7, 8, 9, 10, 11 and 12, and comparison 8, and 9 was measured to be designated as the range of audible frequency in decibel (dB), and the handling stability and comfort were estimated in every 5 grades based on 100 full marks after an experienced driver tested the car on the testing course, and the result was shown in table 4. The endurance was estimated according to P-Matrix tire endurance test of FMVSS 109 under the conditions of 38° C. temperature (±3° C.), 85, 90 and 100% weight marked on the tire and 80 km/h for 34 hours, and if no bead separation, no cord breaking and no belt separation were on the tread, side wall, carcass cord, inner liner and bead part, then the success decision (OK) was given to the tire.

TABLE 4

The result of Tire Test

| | Ex. 5 | Ex. 6 | Ex. 7 | Ex. 8 | Com. 8 |
|---|---|---|---|---|---|
| Tire Weight (kg) | 9.54 | 9.70 | 9.53 | 9.69 | 9.60 |
| Comfort | 100 | 100 | 100 | 100 | 96 |
| Handling Stability | 100 | 100 | 100 | 100 | 95 |
| Endurance | OK | OK | OK | OK | OK |
| Uniformity | 100 | 100 | 100 | 100 | 95 |
| Noise (dB) | 61.4 | 61.4 | 61.4 | 61.4 | 64.2 |

TABLE 5

The result of Tire Test

| | Ex. 9 | Ex. 10 | Ex. 11 | Ex. 12 | Com. 9 |
|---|---|---|---|---|---|
| Tire Weight (kg) | 9.54 | 9.70 | 9.63 | 9.68 | 9.60 |
| Comfort | 100 | 100 | 100 | 100 | 96 |
| Handling Stability | 100 | 100 | 100 | 100 | 95 |
| Endurance | OK | OK | OK | OK | OK |
| Uniformity | 100 | 100 | 100 | 100 | 95 |
| Noise (dB) | 61.4 | 61.4 | 60.4 | 61.0 | 64.2 |

Referring to the result according to Table 4, the tire using the hybrid cord according to the present invention (see example 5, 6, 7 and 8)) has advantages in view of the decrease of noise and handling stability over comparison 8 using the hybrid cord with not-pre-twisted rayon in the cap ply, and also the uniformity of the tire of the present invention has been improved. Furthermore, referring to the result according to Table 5, the tire using the hybrid cord according to the present invention (see example 9, 10, 11 and 12) has advantages over the tire using the hybrid cord to according to comparison 9 in which the hybrid cord comprises no-pre-twisted rayon in the carcass layer in view of the decrease of noise and handling stability, and the uniformity of the tire of the present invention has been improved.

According to the present invention, the fatigue resistance of the tire will be improved by acting the tensile stress in the first on the rayon during the initial elongation of the raw cord in a manner that the twist of yarn is performed after the pre-twist of the rayon yarn with more high elongation or the cable ply process is performed after the twist number of rayon yarn is regulated less than that of the lyocell yarn in the process of the ply twist.

According to the present invention, the noise decrease and handling stability of the tire may be improved up to the preferable degrees by using the hybrid dipped cord produced with the lyocell and rayon yarn for carcass ply and cap ply (belt reinforced belt) of the pneumatic radial tire In the above the present invention was described in detail using only the preferred embodiments, but the modification and variation of the embodiment without departing from the scope of the present invention will be made by the skilled in this art, and therefore it will be understood that it is obvious that the present invention will be not limited by the modification and variation

The invention claimed is:

1. A hybrid dipped cord comprising a rayon yarn of 500 to 3000 deniers and a lyocell yarn of 500 to 3000 deniers, wherein the dipped cord is produced by a method comprising the following steps of;
   producing pre-twisted yarns by twisting one ply rayon yarn toward S direction in a twist number of 20 to 200 TPM;
   producing a ply yarn by twisting the pre-twisted rayon yarn and one ply lyocell yarn not twisted toward Z direction of 300 to 500 TPM, respectively;
   producing a raw cord by cable-twisting toward S direction of 300 to 500 TPM after the ply yarns are combined in two yarns; and
   immersing the raw cord into a dipping solution.

2. The hybrid dipped cord according to claim 1, wherein the fatigue resistance of the hybrid dipped cord is more than 75%.

3. The hybrid dipped cord according to claim 1, wherein the sum of the elongation (E) at a specific load and the shrinkage (S) of the hybrid dipped cord is less than 2.0.

4. A pneumatic radial tire comprising the hybrid dipped cord according to claim 1.

5. The pneumatic radial tire according to claim 4, wherein the tire comprises a pair of parallel bead cores, at least one carcass ply surrounded about the parallel bead cord, a belt layer laminated around the outer circumference of the carcass ply and a belt reinforced layer formed around the outer circumference of the belt layer in the circumference direction, wherein the carcass ply includes the hybrid dipped cord.

6. The pneumatic radial tire according to claim 4, where the tire comprises a pair of parallel bead cores, at least one carcass ply surrounded about the parallel bead core, a belt layer laminated around the outer circumference of the carcass ply and a belt reinforced layer formed around the outer circumference of the belt layer in the circumference direction, wherein the belt reinforced layer includes the hybrid dipped cord.

7. A hybrid dipped cord comprising a rayon yarn of 500 to 3000 deniers and a lyocell yarn of 500 to 3000 deniers, wherein the dipped cord is produced by a method comprising the following steps of;
   producing a ply yarn by twisting one rayon yarn and one lyocell yarn toward Z direction, respectively, wherein the ply-twisting number of the rayon yarn is less than that of the lyocell yarn by 20 to 200 TPM;
   producing a raw cord by cable-twisting toward S direction after the ply yarns are combined in two ply yarns; and
   immersing the raw cord into a dipping solution.

8. The hybrid dipped cord according to claim 7, wherein the fatigue resistance of the hybrid dipped cord is more than 75%.

9. The hybrid dipped cord according to claim 7, wherein the sum of the elongation (E) at a specific load and the shrinkage (S) of the hybrid dipped cord is less than 2.0.

10. A pneumatic radial tire comprising the hybrid dipped cord according to claim 7.

11. The pneumatic radial tire according to claim 10, wherein the tire comprises a pair of parallel bead cores, at least one carcass ply surrounded about the parallel bead cord, a belt layer laminated around the outer circumference of the carcass ply and a belt reinforced layer formed around the outer circumference of the belt layer in the circumference direction, wherein the carcass ply includes the hybrid dipped cord.

12. The pneumatic radial tire according to claim 10, where the tire comprises a pair of parallel bead cores, at least one carcass ply surrounded about the parallel bead core, a belt layer laminated around the outer circumference of the carcass ply and a belt reinforced layer formed around the outer circumference of the belt layer in the circumference direction, wherein the belt reinforced layer includes the hybrid dipped cord.

* * * * *